United States Patent [19]

(12) United States Patent
Ripamonti et al.

(10) Patent No.: US 7,465,245 B2
(45) Date of Patent: Dec. 16, 2008

(54) HYDROMECHANICAL TRANSMISSION FOR AGRICULTURAL TRACTORS

(75) Inventors: Angelo Ripamonti, Treviglio (IT); Giovanni Rivoltella, Treviglio (IT)

(73) Assignee: Same Deutz-Fahr Group S.p.A. (IT)

( * ) Notice: Subject to any disclaimer, the term of this patent is extended or adjusted under 35 U.S.C. 154(b) by 406 days.

(21) Appl. No.: 10/568,322

(22) PCT Filed: Aug. 13, 2004

(86) PCT No.: PCT/EP2004/009120
§ 371 (c)(1),
(2), (4) Date: Jun. 2, 2006

(87) PCT Pub. No.: WO2005/019697

PCT Pub. Date: Mar. 3, 2005

(65) Prior Publication Data
US 2007/0004547 A1 Jan. 4, 2007

(30) Foreign Application Priority Data
Aug. 22, 2003 (IT) .......................... TO2003A0649

(51) Int. Cl.
*F16H 47/04* (2006.01)
(52) U.S. Cl. .............................. 475/83; 475/72; 475/80
(58) Field of Classification Search .................. 475/72, 475/74, 80, 83
See application file for complete search history.

(56) References Cited

U.S. PATENT DOCUMENTS 3,855,879 A    12/1974    DeLalio ....................... 74/687
3,861,240 A    1/1975    Nolan et al. .................. 74/687
6,663,525 B1 *    12/2003    McKee et al. ................ 475/72
6,984,172 B2 *    1/2006    Talbi et al. .................... 460/59
7,063,638 B2 *    6/2006    Weeramantry ............... 475/74

FOREIGN PATENT DOCUMENTS

DE    10122 823 A1    11/2002
EP    0 577 282 A1    1/1994
GB    1 181 526    2/1970
JP    02046350 A  *    2/1990

OTHER PUBLICATIONS

International Search Report re application No. PCT/EP2004/009120, dated Nov. 4, 2004.
Written Opinion re international application No. PCT/EP 2004/009120, dated Nov. 4, 2004.

* cited by examiner

*Primary Examiner*—Ha D. Ho
(74) *Attorney, Agent, or Firm*—Cook Alex Ltd.

(57) ABSTRACT

The transmission comprises: an input shaft coupled to a prime mover of the tractor; an output shaft; a hydrostatic unit including a pump driven by the prime mover shaft and a motor driven by the pump; an epicyclic torque splitter unit, including a first and a second input shaft and a first and a second output shaft, the rotational speeds of the first and second output shafts varying, respectively, in a first and a second range adjacent to each other as the rotational speed of the first input shaft varies between a maximum value and a minimum value; a clutch unit, arranged to couple the output shaft of the transmission selectively to the first or second output shaft of the torque splitter unit to provide a pair of forward operating ranges, at high and low speed respectively; and a reversing unit, arranged to provide a reverse operating range.

11 Claims, 5 Drawing Sheets

HYDROMECHANICAL TRANSMISSION FOR AGRICULTURAL TRACTORS

FIELD OF THE INVENTION

The present invention relates to a continuously variable hydromechanical transmission for agricultural tractors, particularly for special tractors to be used in orchards or the like.

BACKGROUND OF THE INVENTION

Tractors of this type require transmissions which are extremely compact, both in terms of height and in the direction of the width of the vehicle, since the transmission is housed under the driving area of the vehicle, between the driver's footrests. Hydromechanical transmissions of the known type are hardly suitable for fitting on these agricultural tractors, since they have large overall transverse dimensions.

The object of the present invention is therefore to provide a hydromechanical transmission for agricultural tractors, particularly for special tractors to be used in orchards or the like, which has a structure which is as compact as possible.

SUMMARY OF THE INVENTION

Briefly, the invention is based on the idea of providing a continuously variable hydromechanical transmission comprising:
- a hydrostatic unit including a variable displacement pump which can be driven by the prime mover shaft of the tractor and a fixed displacement motor driven by the pump, wherein the pump and motor are positioned in line along a direction spaced transversely downwards from the axis of the prime mover shaft and from the axis of the shaft of the power take-off of the tractor;
- an epicyclic torque splitter unit, positioned in line with the hydrostatic unit and including a first and a second input shaft, coupled to the motor of the hydrostatic unit and to the tractor's prime mover respectively, and at least a first and a second output shaft;
- a clutch unit, positioned in line with the hydrostatic unit and with the torque splitter unit and arranged to couple the output shaft of the transmission selectively to the first or second output shaft of the torque splitter unit, in such a way as to provide a pair of forward operating ranges;
- a reversing unit, positioned in line with the hydrostatic unit, the torque splitter unit and the clutch unit, and arranged to provide a reverse operating range.

BRIEF DESCRIPTION OF THE DRAWINGS

The characteristics and advantages of the present invention will appear from the following detailed description, provided purely by way of non-limitative example, with reference to the attached drawings, in which.

DETAILED DESCRIPTION OF THE INVENTION

Figure 1:
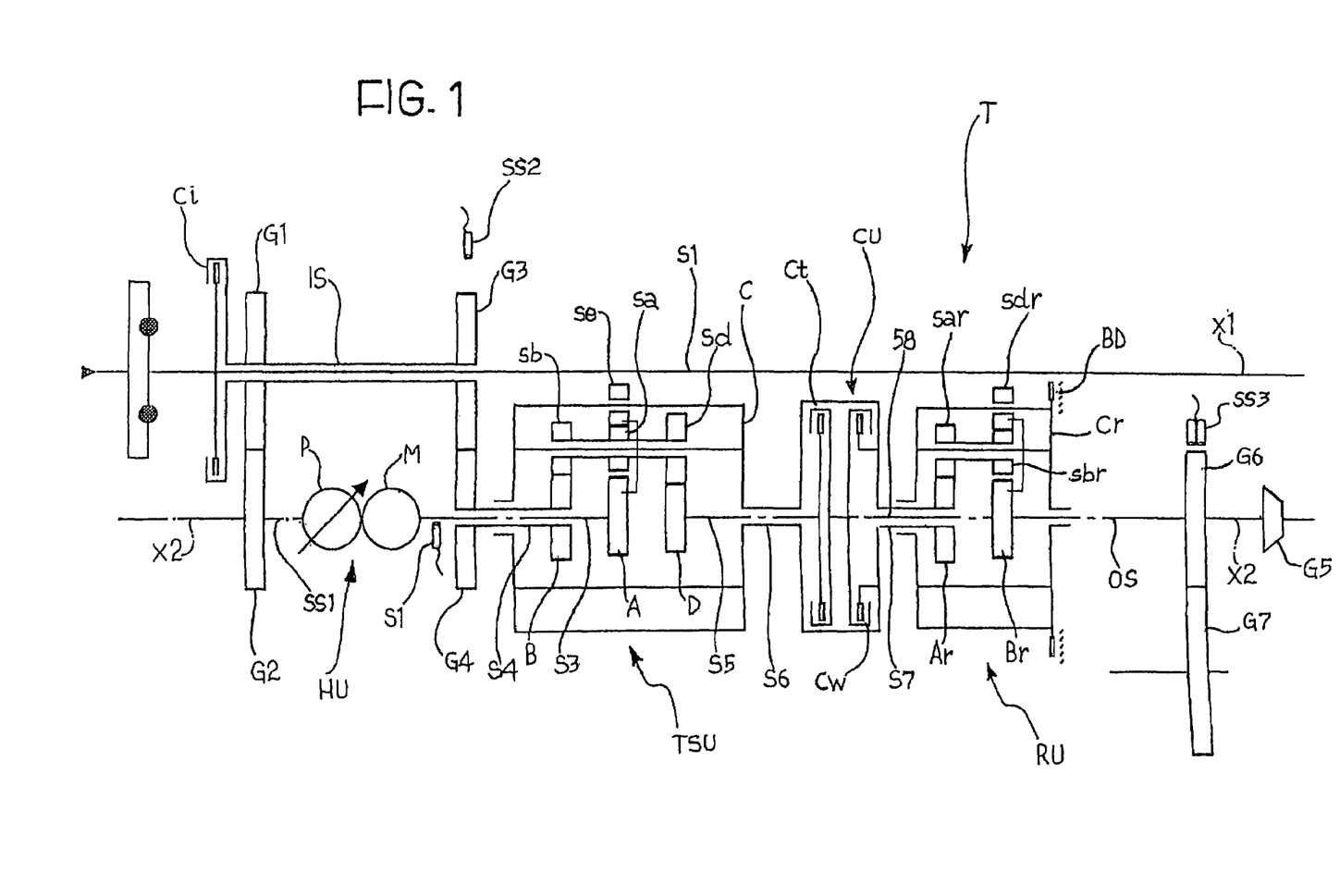
FIG. 1 is a schematic illustration of a continuously variable hydromechanical transmission according to a first embodiment of the present invention.

With reference first to FIG. 1, a continuously variable hydromechanical transmission according to a first embodiment of the present invention is generally indicated T.

The transmission T has an input shaft IS which can be coupled by means of a clutch Ci to an internal combustion prime mover (not shown) of an agricultural tractor. The input shaft IS is coaxial with a shaft S1 of the power take-off of the tractor, which extends in the longitudinal direction of the tractor along an axis x1.

The transmission T comprises a hydrostatic unit HU consisting of a variable displacement pump P and a fixed displacement motor M, positioned in line along an axis x2 parallel to, and offset downwards from, the axis x1. Clearly, the motor M could also be of the variable displacement type.

The transmission T also comprises a mechanical torque splitter unit TSU of the epicyclic type, positioned in line with the hydrostatic unit HU.

The input shaft IS carries a first gear wheel G1 which meshes with a gear wheel G2 carried by an input shaft S2 of the hydrostatic unit HU. The pump P of the hydrostatic unit can therefore be driven by the tractor's prime mover by means of this first gearing G1-G2.

The torque splitter unit TSU includes:
- a first input sun gear A drivingly connected to an output shaft S3 of the hydrostatic unit HU, in other words to a first input shaft of the unit TSU;
- a second input sun gear B drivingly connected to a second input shaft S4 of the unit TSU, made in the form of a hollow shaft in which the shaft S3 is inserted;
- an output sun gear D drivingly connected to a first output shaft S5 of the unit TSU; and
- a double planet carrier C which carries, on an inner circumference, three sets, spaced apart angularly at 120° (only one of which is shown in FIG. 1), of three planet gears sb, sa, sd drivingly connected for rotation to each other, and, on an outer circumference, three planet gears se, spaced apart angularly at 120° (only one of which is shown in FIG. 1).

Each of the planet gears sb meshes with the sun gear B, each of the planet gears sa meshes indirectly with the sun gear A via the planet gears se, and each of the planet gears sd meshes with the sun gear D. The planet carrier C is drivingly connected to a second output shaft S6 of the unit TSU, made in the form of a hollow shaft in which the first output shaft S5 is inserted.

The input shaft IS also carries a second gear wheel G3 which meshes with a gear wheel G4 carried by the input shaft S4 of the torque splitter unit TSU. The unit TSU therefore receives torque from the tractor's prime mover through this second gearing G3-G4, as well as from the hydrostatic unit HU (through the shaft S3 and the sun gear A).

The transmission T also comprises a reversing unit RU, of the epicyclic type, positioned in line with the hydrostatic unit HU and with the torque splitter unit TSU along the longitudinal axis x2.

The reversing unit RU includes:
- a first sun gear Ar drivingly connected to a first input shaft S7 of the unit RU, made in the form of a hollow shaft drivingly connected for rotation to the second output shaft S6 of the torque splitter unit TSU;

a second sun gear Br drivingly connected both to a second input shaft S8 and to an output shaft OS of the unit RU, wherein the second input shaft S8 is inserted in the first hollow input shaft S7 and the output shaft OS also forms the output shaft of the transmission T, which imparts the motion to the rear wheels of the tractor through a bevel gear G5 and to the front wheels through a gearing G6-G7; and a double planet carrier Cr, which carries on an inner circumference three sets, spaced apart angularly at 120° (only one of which is shown in FIG. 1), of two planet gears sar and sbr, drivingly connected for rotation to each other, and, on an outer circumference, three planet gears sdr, spaced apart angularly at 120° (only one of which is shown in FIG. 1).

Each of the planet gears sar meshes with the sun gear Ar, and each of the planet gears sbr meshes indirectly with the sun gear Br via a corresponding planet gear sdr. The planet carrier Cr is mounted rotatably with respect to the input and output shafts of the unit RU and can be locked by means of a braking device BD of a per-se-known type.

A clutch unit CU is interposed between the torque splitter unit TSU and the reversing unit RU, and includes:

a first clutch Cw for coupling the first and second input shaft S7, S8 of the reversing unit RU to provide a first low-speed "work" operating range of the transmission, as will be explained in detail below; and a second clutch Ct for coupling the first output shaft S5 of the torque splitter unit TSU to the second input shaft S8 of the reversing unit RU to provide a second higher-speed "transport" operating range of the transmission, as will be illustrated in the rest of the description.

A set of speed sensors is also provided, comprising, in the illustrated embodiment, a first sensor ss1 associated with the output shaft S3 of the hydrostatic unit HU, a second sensor ss2 associated with the gear wheel G3 carried by the input shaft IS of the transmission T and a third sensor ss3 associated with the gear wheel G6 carried by the output shaft OS of the transmission T. These sensors supply respective signals to an electronic controller of the transmission (not shown).

The operation of the aforementioned individual components of the transmission will now be described in detail.

The clutch Ci, which enables the internal combustion engine of the tractor to be coupled to the transmission T, is hydraulically operated by pressurized oil and is therefore disengaged when the engine is stopped. The clutch Ci assists the starting of the internal combustion engine, since it disengages it from the downstream components and their inertia. When the tractor is stationary and the power take-off is operating, the clutch Ci disengages the internal combustion engine from the transmission T, thus drastically reducing the power dissipated. The clutch Ci can also uncouple the internal combustion engine from the transmission, and therefore from the wheels, in an emergency.

The two gearings G1-G2 and G3-G4 drive the hydrostatic unit HU and the torque splitter unit TSU respectively. In particular, the gearing G1-G2 transmits the motion to the variable displacement pump P of the hydrostatic unit HU at a rotational speed which is determined, with a constant transmission ratio $\tau_{12}$, by the rotational speed of the tractor's internal combustion engine. The gearing G3-G4 transmits the motion to the sun gear B of the torque splitter unit TSU with a rotational speed rpmB which is determined, with a constant transmission ratio $\tau_{34}$, by the rotational speed of the internal combustion engine.

As regards the hydrostatic unit HU, assuming that the clutch Ci is engaged and the tractor's internal combustion engine is running at a constant rotational speed rpmE (corresponding, for example, to the maximum torque speed), the pump 1 is driven by the internal combustion engine through the gearing G1-G2 at a constant rotational speed rpmP equal to rpmE/$\tau_{12}$, and in turn drives the motor M while continuously varying its own displacement. This variation of displacement is obtained by varying the inclination of a swash plate of per-se-known type which carries the pistons of the pump P and which is operated, for example, by two proportional solenoid valves which receive from the electronic controller appropriate control signals, according to whether the tractor driver wishes to reduce or increase the speed of the vehicle. The rotational speed rpmA of the motor M and of the sun gear A connected to it therefore varies continuously between a value rpmA=rpmP and a value rpmA=–rpmP as the inclination of the plate varies between a maximum positive value and a maximum negative value.

Preferably, as shown in the embodiment of FIG. 1, the transmission ratio $\tau_{12}$ of the gearing G1-G2 is equal to the transmission ratio $\tau_{34}$ of the gearing G3-G4 ($\tau_{12}=\tau_{34}=\tau$), assuming that, at least initially, the volumetric efficiency of the pump P and motor M unit is equal to 1, so that the pump P and the sun gear B rotate at the same rotational speed rpmP=rpmB=rpmE/$\tau$. The rotational speed rpmA of the motor M and of the sun gear A connected to it therefore varies continuously between rpmB and –rpmB.

As regards the torque splitter unit TSU, this is driven both by the hydraulic motor M of the hydrostatic unit HU, through the sun gear A which rotates at a speed rpmA which is variable (between –rpmB and +rpmB), and by the tractor's internal combustion engine, through the sun gear B which rotates at a constant speed rpmB.

Figure 2:
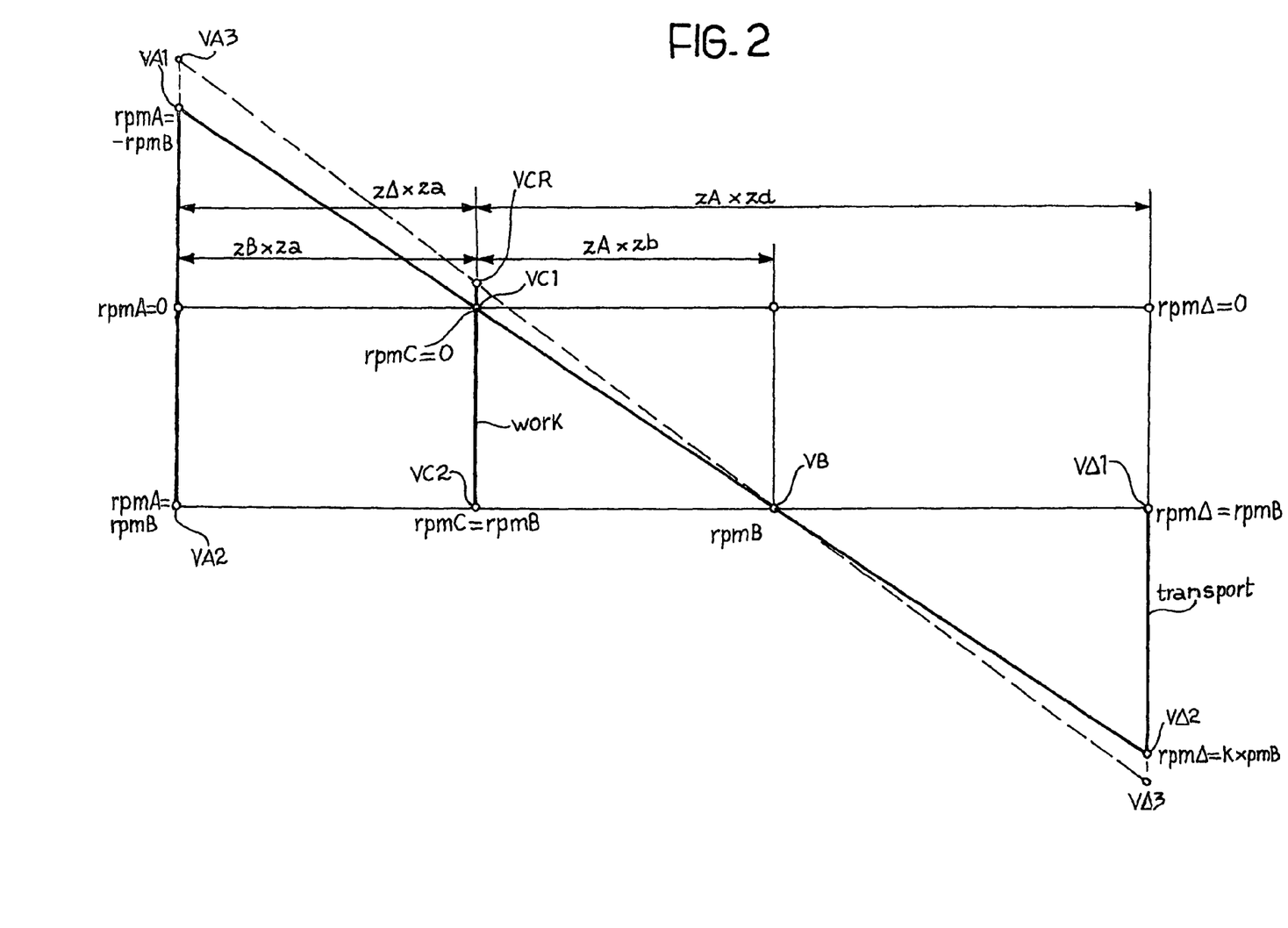
FIG. 2 is the Ravigneaux speed graph relating to the torque splitter unit of the transmission of FIG. 1.

The rotational speeds of the sun gears A, B and D and of the planet carrier C of the unit TSU are correlated with each other as shown by the Ravigneaux graph of FIG. 2, in which za, zb and zd indicate, respectively, the numbers of teeth of the planet gears sa, sb and sd, whereas zA, zB and zD indicate, respectively, the numbers of teeth of the sun gears A, B and D. Retaining the previous assumption that the sun gear B rotates at a constant speed rpmB, while the sun gear A rotates at a speed rpmA varying between –rpmB and +rpmB, the speed characteristic of the sun gear B is represented by the point VB, that of the sun gear A is represented by the segment lying between the points VA1 (where rpmA=–rpmB) and VA2 (where rpmA=+rpmB), that of the planet carrier C is represented by the segment lying between the points VC1 (where rpmC=0) and VC2 (where rpmC=+rpmB) and that of the sun gear D is represented by the segment lying between the points VD1 (where rpmD=+rpmB) and VD2 (where rpmD=k× rpmB, k being a constant depending on the number of teeth of the gear wheels of the epicyclic torque splitter unit TSU).

The aforementioned first "work" operating range is obtained by engaging the clutch Cw of the clutch unit CU and leaving both the other clutch Ct of the unit CU and the braking device BD of the reversing unit RU disengaged, in such a way that the output shaft OS of the transmission T is coupled to the second output shaft S6 of the torque splitter unit TSU which is drivingly connected to the planet carrier C. In this way, as the rotational speed of the hydraulic motor M of the hydrostatic unit HU varies between –rpmB and +rpmB, the rotational speed of the planet carrier C varies between 0 and +rpmB (as shown in the Ravigneaux graph described above), and therefore the speed of the tractor varies between 0 and a value v_work, equal to 20 km/h for example.

At the speed v_work, the plates and counterplates of the clutches Cw and Ct rotate at the same speed rpmB, as can be seen from the Ravigneaux graph described above. In fact, the plate of the clutch Cw, which is drivingly connected to the output shaft S6 and to the planet carrier C of the torque splitter unit TSU, rotates at the speed rpmB together with the associated counterplate to which it is coupled for rotation. As regards the clutch Ct, the counterplate is drivingly connected to the counterplate of the clutch Cw and therefore rotates at rpmB, as does the plate which is carried by the output shaft of the unit TSU drivingly connected to the sun gear D. It is thus possible to disengage the clutch Cw and engage the clutch Ct, thereby obtaining the "transport" operating range, in which the output shaft OS of the transmission T is coupled, through the sun gear Br and the shaft S8 of the reversing unit RU, to the first output shaft S5 of the torque splitter unit TSU which is drivingly connected to the sun gear D. At this point, as the rotational speed of the hydraulic motor M of the hydrostatic unit HU varies between +rpmB and −rpmB, the rotational speed of the sun gear D varies between +rpmB and k×rpmB (as results from the Ravigneaux graph described above), and therefore the speed of the tractor varies between v_work and a maximum value v_max, equal to approximately 45 km/h for example.

A third "reverse" operating range, for moving the tractor in reverse (up to a maximum speed v_rev, of approximately 25 km/h for example), is obtained by operating the braking device BD of the reversing unit RU in such a way as to lock the planet carrier Cr.

Figure 5:
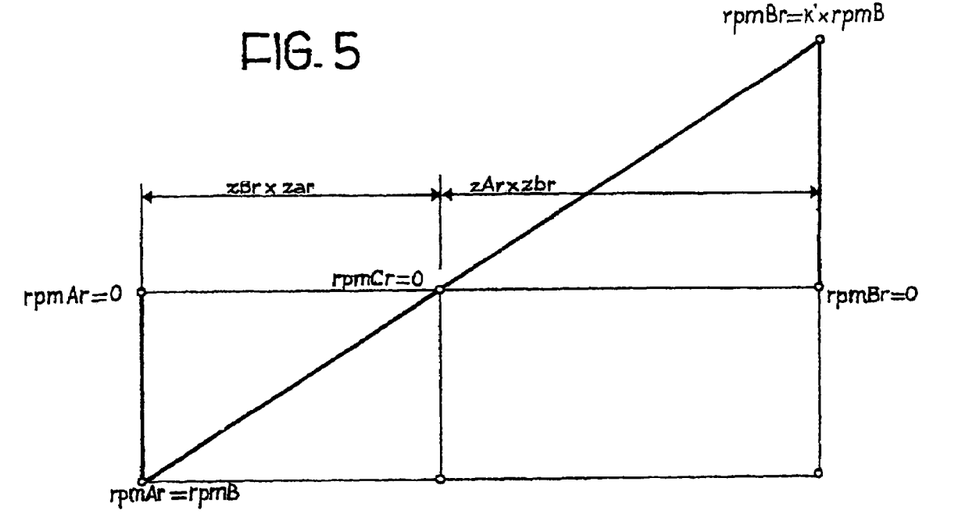
FIG. 5 is the Ravigneaux speed graph relating to the reversing unit of the transmissions of FIGS. 1 and 3.

Assuming that the planet carrier is locked, the rotational speeds of the sun gears Ar and Br and of the planet carrier Cr of the reversing unit RU are correlated with each other as shown in the Ravigneaux graph of FIG. 5, in which zar and zbr indicate, respectively, the numbers of teeth of the planet gears sar and sbr, while zAr and zBr indicate, respectively, the numbers of teeth of the sun gears Ar and Br. The input sun gear Ar is drivingly connected to the planet carrier C of the torque splitter unit TSU and therefore its rotational speed rprAr varies between 0 and +rpmB as rpmA varies between −rpmB and +rpmB. The output sun gear Br, which is drivingly connected to the output shaft OS of the transmission T, rotates in the opposite direction to the input sun gear Ar, thus reversing the output motion, with a rotational speed rpmBr ranging from 0 (when rpmAr=rpmC=0) to k'×rpmB (when rpmAr=rpmC=rpmB), where k' is a constant which depends on the number of teeth of the gears of the epicyclic unit RU.

Figure 6:
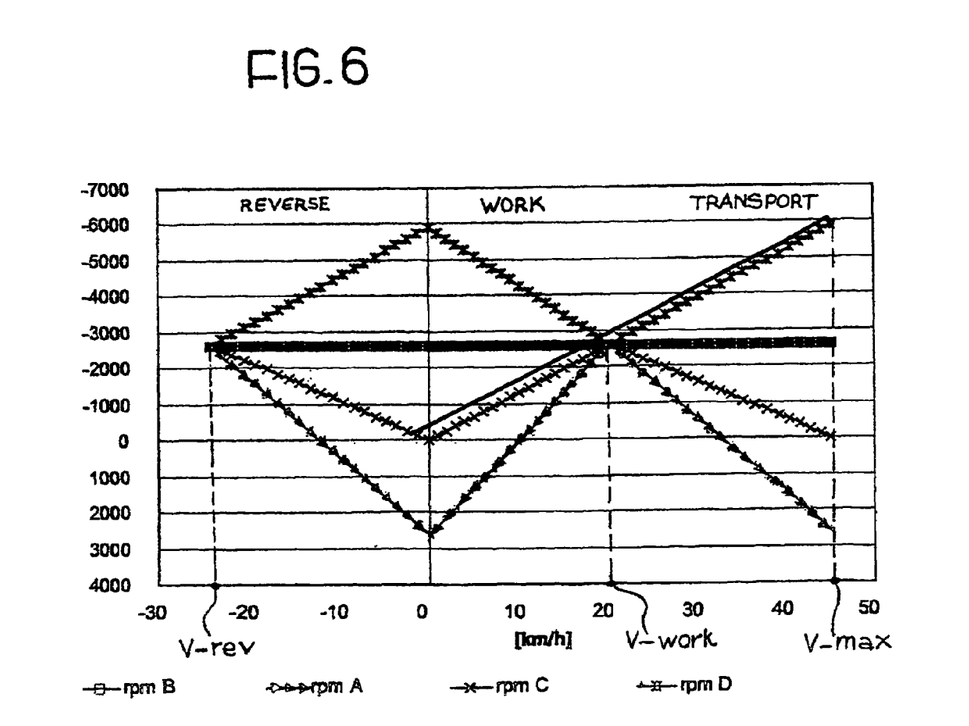
FIG. 6 is a graph showing an operating characteristic, in the diagram of speed of the tractor/number of revolutions of the output shaft of the hydrostatic unit, which can be obtained with a transmission according to the invention.

The three operating ranges, "work", "transport" and "reverse", are represented in the graph of FIG. 6, which shows the variation of the rotational speeds rpmA (input sun gear A), rpmB (input sun gear B), rpmC (planet carrier C) and rpmD (output sun gear D) as a function of the speed of the tractor.

The operation of the transmission T is controlled by the aforementioned electronic controller, which continuously regulates the transmission ratio, and therefore the speed of the tractor, by varying the rotational speed of the output shaft of the hydrostatic unit and controlling the engagement and/or disengagement of the clutches, for example according to the commands given by the driver by means of per-se-known electro-hydraulic devices and according to the information on force and torque at the tyres and at the internal combustion engine. The signals corresponding to the rotational speed of the output shaft of the hydrostatic unit, of the input shaft of the transmission and of the output shaft of the transmission, read by the sensors ss1, ss2 and ss3 respectively, in addition to that of the internal combustion engine (detected by a specific sensor, not shown in the figures), are used as feedback signals for the closed-loop control of the transmission.

According to another advantageous characteristic of the invention, the hydrostatic unit HU of the transmission T is designed in such a way that the maximum speed of the motor M is reached with an inclination of the plate of the pump P which is less (by approximately 10% for example) than the maximum attainable inclination. There is consequently a reserve of angle of inclination of the plate which enables the rotational speed of the hydraulic motor M to be brought to values of less than −rpmB, as indicated by the segment VA1-VA3 shown in a broken line in the Ravigneaux graph of FIG. 2.

In this way, with the transmission operating in the "work" range (that is, with the clutch Cw engaged, the clutch Ct disengaged and the braking device BD of the reversing unit RU disabled), reversing can be carried out at low speed, up to approximately −2 km/h for example, as shown by the segment VC1-VCR of the Ravigneaux graph, without the need to use the reversing unit. This operating condition is particularly useful when the position of the tractor has to be corrected continually, for example during the attachment of transported or towed equipment.

Similarly, with the transmission operating in the "transport" range (that is, with the clutch Ct engaged, the clutch Cw disengaged and the braking device BD of the reversing unit RU disabled), it is possible to reach a maximum speed of the tractor above the speed v_max (by approximately 2.5 km/hr for example), by making the transmission operate in the portion of the characteristic defined by the segment VD2-VD3 of the Ravigneaux graph, or to reduce the rotational speed of the internal combustion engine while maintaining the same maximum speed of the tractor so as to limit the fuel consumption and noise level.

As will be clear from the preceding description, the transmission according to the invention offers the advantage of an extremely compact structure, by virtue of the hydrostatic unit, the torque splitter unit, the clutch unit and the reversing unit being positioned in line along a longitudinal axis spaced downwards from the axis of the shaft of the power take-off of the tractor. This characteristic of compactness is further ensured by the particular construction, without a ring gear, of the epicyclic gear train forming the torque splitter unit.

A second embodiment of a hydromechanical transmission according to the invention will now be described briefly with reference to FIGS. 3 and 4, in which parts and elements identical or corresponding to those of FIGS. 1 and 2 previously described have been given the same reference symbols.

Figure 3:
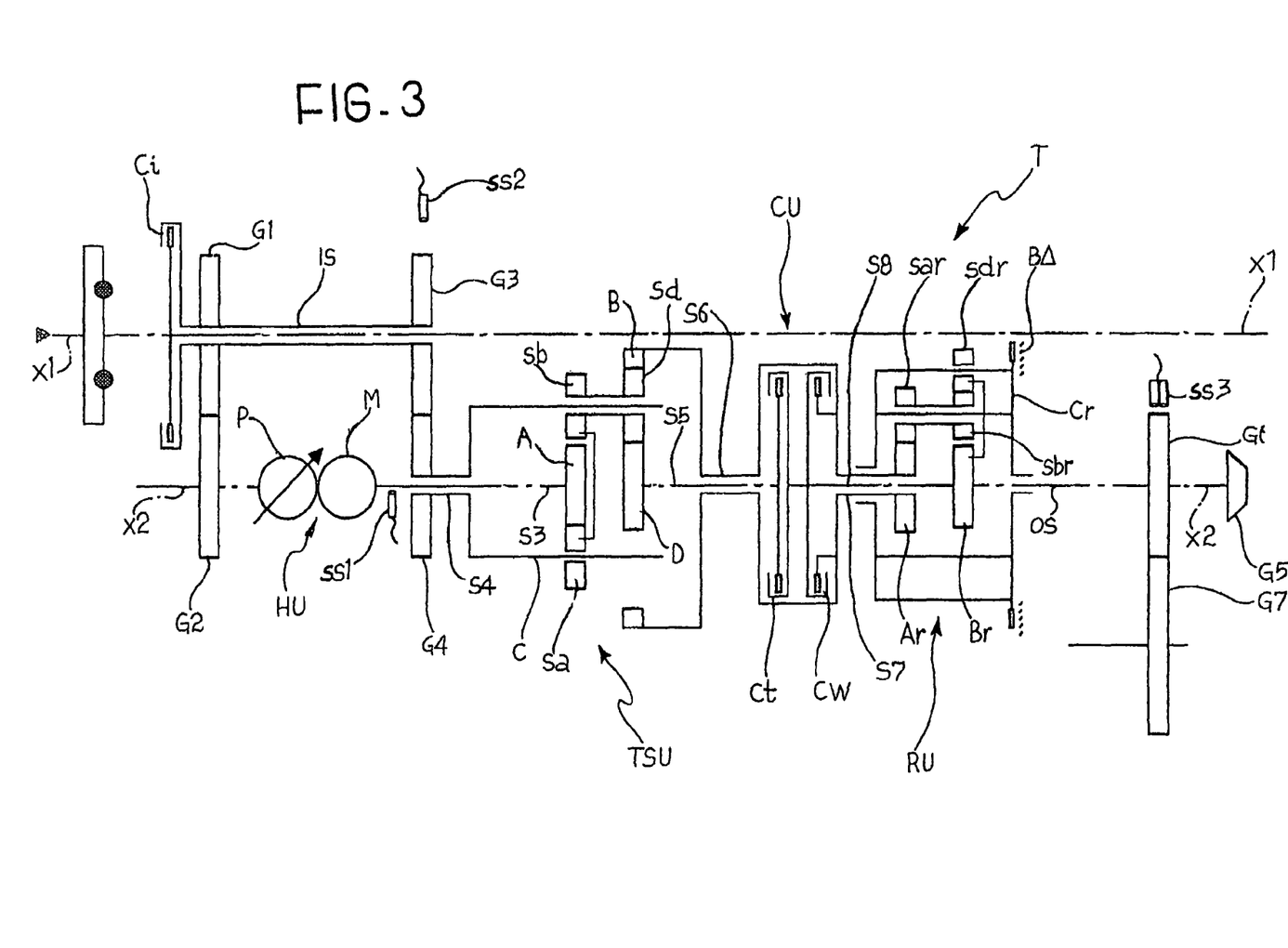
FIG. 3 is a schematic illustration of a second embodiment of a hydromechanical transmission according to the invention.

The structure of this second embodiment of the transmission T is substantially identical to that of the first embodiment, except for the torque splitter unit TSU consisting of an epicyclic gear train with a ring gear. In this case, in fact, the torque splitter unit TSU includes:

a first input sun gear A drivingly connected to the output shaft S3 of the hydrostatic unit HU;

an input planet carrier C drivingly connected to the input shaft S4 of the unit TSU made in the form of a hollow shaft in which the shaft S3 is inserted;

an output sun gear D drivingly connected to the first output shaft S5 of the unit TSU;

an output ring gear B drivingly connected to the second output shaft S6 of the unit TSU; wherein the planet carrier C carries:

three sets of planet gears sb and sd, spaced apart angularly at 120° (only one of which is shown in FIG. 3), the gears being drivingly connected for rotation to each other; and three planet gears sa spaced apart angularly at 120° (only one of which is shown in FIG. 3), each of the planet gears sb meshing indirectly with the sun gear A via a corresponding planet gear sa and each of the planet gears sd being interposed between the sun gear D and the ring gear B.

Figure 4:
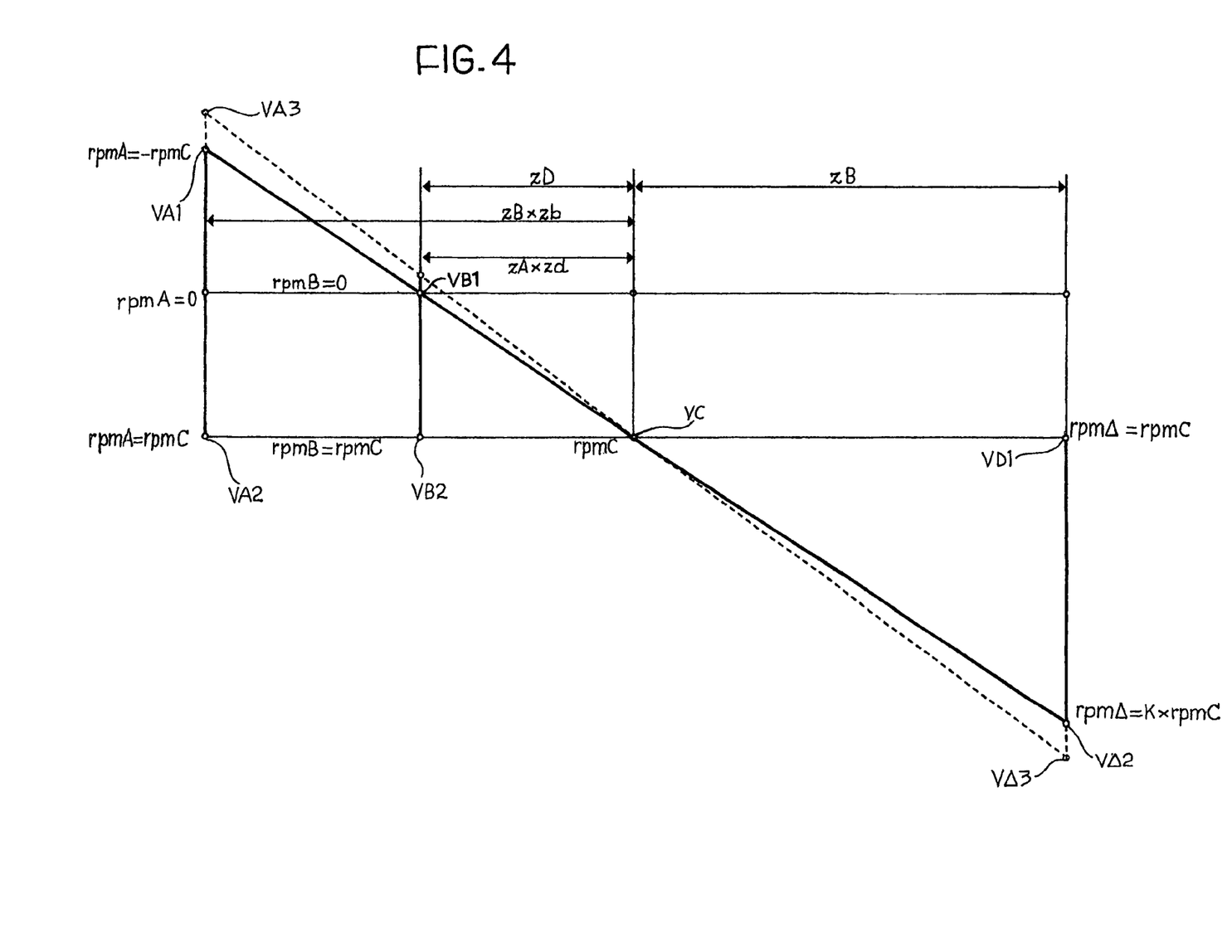
FIG. 4 is the Ravigneaux speed graph relating to the torque splitter unit of the transmission of FIG. 3.

The speeds of the sun gears and the planet carrier are correlated as shown by the Ravigneaux graph in FIG. 4. By contrast with the first embodiment, in this case the rotational speed rpmc of the planet carrier is constant, since the planet carrier is driven directly by the internal combustion engine through the gearing G3-G4, while the rotational speed rpmA of the input sun gear A varies between −rpmC and +rpmc as a function of the variation of the displacement of the pump P of the hydrostatic unit HU. Consequently, as the rotational speed rpmA of the sun gear A varies between −rpmC and +rpmc, the rotational speed rpmB of the output ring gear B varies between 0 and +rpmc (the segment VB1-VB2), thus providing the "work" operating range, in which the speed of the tractor varies between 0 and, for example, 20 km/hr. If rpmA is then varied between +rpmC and −rpmC, the rotational speed rpmD of the output sun gear D varies between +rpmc and k×rpmC (the segment VD1-VD2), where k is a parameter which depends on the design of the epicyclic unit TSU, thus providing the "transport" operating range, in which the speed of the tractor varies, for example, between 20 km/hr and 60 km/hr.

With respect to the solution using a torque splitter without a ring gear, this second embodiment has a smaller overall axial dimension, since it uses a double planet gear sb-sd in place of the triple planet gear sb-sa-sd, but it has a greater overall radial dimension owing to the presence of the ring gear B. This second solution also provides values of k greater than those obtainable in the case of the splitter without the ring gear (for example, values equal to or greater than 3, instead of values of approximately 2-2.5), and therefore maximum speeds greater than those of the solution without ring gear, or alternatively, for the same maximum speed, the possibility of shifting from the "work" range to the "transport" range at a lower speed (for example at approximately 15 km/hr instead of 20 km/hr). Like the version without ring gear, this second solution also enables the maximum angular travel of the pump plate to be used to carry out the reverse during operation in the "work" range, without the need to disengage the clutch Cw and operate the braking device BD.

Clearly, the principle of the invention remaining unchanged, the embodiments and details of construction can vary widely from those described and illustrated, purely by way of non-limitative example.

The invention claimed is:

1. Continuously variable hydromechanical transmission for agricultural tractors, comprising:
   an input shaft (1S) arranged to be coupled to a prime mover of the tractor and extending along a first direction (x1) substantially aligned with the shaft of the prime mover and with a shaft (S1) of a power take-off of the tractor;
   an output shaft (OS);
   a hydrostatic unit (HU) including a variable displacement pump (P) arranged to be driven by the prime mover shaft of the tractor and a motor (M) driven by the pump (P), wherein the pump and motor are positioned substantially in line along a second direction (x2) spaced transversely downwards from said first direction (x1);
   a torque splitter unit (TSU) of an epicyclic gearing, positioned substantially in line with the hydrostatic unit (HU) along said second direction (x2) and including a first and a second input shaft (S3, S4), coupled to the motor (M) of the hydrostatic unit (HU) and to the prime mover of the tractor respectively, and at least a first and a second output shaft (S5, S6), the rotational speeds of said first and second output shafts (S5, S6) varying, respectively, in a first and a second range (VD1-VD2, VC1-VC2; VD1-VD2, VB1-VB2) adjacent to each other, at high speed and low speed respectively, as the rotational speed of the first input shaft (S3) varies between a maximum value (rpmA; rpmC) and a minimum value (−rpmA; −rpmC);
   a clutch unit (CU), positioned substantially in line with the hydrostatic unit (HU) and with the torque splitter unit (TSU) along said second direction (x2) and arranged to couple the output shaft (OS) of the transmission selectively to the first or second output shaft (S5, S6) of the torque splitter unit (TSU), in such a way as to provide a pair of forward operating ranges ("transport" and "work"), at high and low speed respectively; and
   a reversing unit (RU), positioned substantially in line with the hydrostatic unit (HU), the torque splitter unit (TSU) and the clutch unit (CU) along said second direction (x2), and interposed between the clutch unit (CU) and the output shaft (OS) of the transmission, said unit being arranged to provide a reverse operating range ("reverse").

2. Hydromechanical transmission according to claim 1, characterized in that it also comprises a first clutch (C1) for coupling the input shaft (1S) of the transmission to the shaft of the prime mover of the tractor.

3. Hydromechanical transmission according to claim 1 or 2, characterized in that the input shaft (1S) is made in the form of a hollow shaft and houses within it the shaft (S1) of the power take-off of the tractor.

4. Hydromechanical transmission according to claim 1, characterized in that the input shaft (1S) carries a first and a second driving gear wheel (G1, G3) meshing, respectively, with a third driven gear wheel (G2), coupled to a driving shaft (S2) of the pump (P) of the hydrostatic unit (HU), and with a fourth driven gear wheel (G4), coupled to the second input shaft (S4) of the torque splitter unit (TSU), in such a way that the pump (P) and the second input shaft (S4) are driven by the input shaft (1S), in other words by the prime mover of the tractor, with corresponding constant predetermined transmission ratios ($\tau_{12}$, $\tau_{34}$) through the first and third gear wheels (G1-G2) and the second and fourth gear wheels (G3-G4), respectively.

5. Hydromechanical transmission according to claim 1, characterized in that the torque splitter unit (TSU) includes:
   a first input sun gear (A) drivingly connected to the first input shaft (S3);
   a second input sun gear (B) drivingly connected to the second input shaft (S4);
   an output sun gear (D) drivingly connected to the first output shaft (S5); and
   a double planet carrier (C) which carries, on an inner circumference, sets of three planet gears (sa, sb, sd) drivingly connected for rotation to each other, namely a first planet gear (sa), a second planet gear (sb) and a third planet gear (sd), and, on an outer circumference, fourth planet gears (se); the first planet gear (sa) meshing with the first input sun gear (A) via a corresponding fourth planet gear (se), the second planet gear (sb) meshing with the second input sun gear (B) and the third planet gear (sd) meshing with the output sun gear (D); the planet carrier (C) also being drivingly connected to the second output shaft (S6).

6. Hydromechanical transmission according to claim 1, characterized in that the torque splitter unit (TSU) includes:
   a first input sun gear (A) drivingly connected to the first input shaft (S3);
   an input planet carrier (C) drivingly connected to the second input shaft (S4);

an output sun gear (D) drivingly connected to the first output shaft (S5);

an output ring gear (B) drivingly connected to the second output shaft (S6), wherein the planet carrier (C) carries:

sets of two planet gears (sb, sd), drivingly connected for rotation to each other, namely a first planet gear (sb) and a second planet gear (sd), and third planet gears (sa), the first planet gear (sb) meshing with the input sun gear (A) via a corresponding third planet gear (sa) and the second planet gear (sd) being interposed between the output sun gear (D) and the output ring gear (B).

7. Hydromechanical transmission according to claim 1, characterized in that the reversing unit (RU) includes:

a third and a fourth input shaft (S7, S8);

a first sun gear (Ar) drivingly connected to said third input shaft (S7);

a second sun gear (Br) drivingly connected both to said fourth input shaft (S8) and to the output shaft (OS) of the transmission; and a double planet carrier (Cr), which carries on an inner circumference sets of two planet gears (sar, sbr), drivingly connected for rotation to each other, namely a first planet gear (sar) and a second planet gear (sbr), and, on an outer circumference, third planet gears (sdr), the first planet gear (sar) meshing with the first sun gear (Ar), and the second planet gear (sbr) meshing with the second sun gear (Br) via a corresponding third planet gear (sdr), the gear carrier (Cr) being mounted rotatably with respect to said third and fourth input and output shafts (S8, S7, OS) and being lockable via a braking device (BD).

8. Hydromechanical transmission according to claim 1, characterized in that the clutch unit (CU) includes:

a first clutch (Cw) for coupling a third and fourth input shaft (S7, S8) of the reversing unit (RU) to provide the said low-speed forward operating range ("work") of the transmission; and a second clutch (Ct) for coupling the first output shaft (S5) of the torque splitter unit (TSU) to the fourth input shaft (S8) of the reversing unit (RU) to provide the said high-speed forward operating range ("transport") of the transmission.

9. Hydromechanical transmission according to claim 1, characterized in that it also comprises an electronic controller for setting the rotational speed of the pump (P) of the hydrostatic unit (HU), for engaging or disengaging clutches (C1, Ct, Cw) and for activating or disabling a braking device (BD) of the reversing unit (RU) according to predetermined operating modes, to provide the forward operating ranges ("work" and "transport") and the reverse operating range ("reverse").

10. Hydromechanical transmission according to claim 9, characterized in that it also comprises a first speed sensor (ss1) for detecting the rotational speed of the first input shaft of the torque splitter unit (TSU), a second speed sensor (ss2) for detecting the rotational speed of the input shaft (1S) of the transmission and a third speed sensor (ss3) for detecting the rotational speed of the output shaft (OS) of the transmission, each of said sensors supplying a corresponding signal to the electronic controller of the transmission.

11. Hydromechanical transmission according to claim 1, characterized in that the hydrostatic unit (HU) can supply a rotational speed of the first input shaft (S3) of the torque splitter unit (TSU), a modulus of which is greater than a modulus of the minimum value (−rpmA; −rpmC), in such a way that when the transmission is operating in the low-speed operating range ("work") it is possible to reverse at low speed without the need to operate the reversing unit (RU) and the clutch unit (CU).

* * * * *